United States Patent [19]

Bopp

[11] 4,346,797

[45] Aug. 31, 1982

[54] MAGNETICALLY ACTUATED VISCOUS FLUID COUPLING

[75] Inventor: Warren G. Bopp, Farmington Hills, Mich.

[73] Assignee: Eaton Corporation, Cleveland, Ohio

[21] Appl. No.: 172,320

[22] Filed: Jul. 25, 1980

[51] Int. Cl.³ .................. F16D 35/00; F16D 43/25
[52] U.S. Cl. .............................. 192/58 B; 192/82 T; 192/84 R; 251/129
[58] Field of Search .............. 192/82 T, 58 B, 84 R; 251/129, 141

[56] References Cited

U.S. PATENT DOCUMENTS

| Re. 30,428 | 11/1980 | Detty | 192/58 B |
|---|---|---|---|
| 2,521,117 | 9/1950 | DuBois et al. | 192/58 B X |
| 2,912,963 | 11/1959 | Dufresne | 123/41.12 |
| 3,055,473 | 9/1962 | Oldberg et al. | 192/58 B |
| 3,250,355 | 5/1966 | Weir | 192/58 B |
| 3,419,122 | 12/1968 | Connelly | 192/58 B |
| 4,056,178 | 11/1977 | Detty | 192/58 B |
| 4,074,662 | 2/1978 | Estes | 192/82 T X |
| 4,119,184 | 10/1978 | Mower et al. | 192/82 T |
| 4,246,995 | 1/1981 | Gee | 192/58 B |
| 4,265,348 | 5/1981 | Clarke | 192/58 B |
| 4,270,641 | 6/1981 | Nonnenmann et al. | 192/58 B X |
| 4,271,945 | 6/1981 | Budinski | 192/58 B |

Primary Examiner—Rodney H. Bonck
Attorney, Agent, or Firm—C. H. Grace; F. M. Sajovec

[57] ABSTRACT

A viscous fan clutch (10) is typically employed in a fan drive mechanism within a truck or automobile. A shaft (12) driven by the engine, rotates a clutch member (24) within the fan drive. The clutch member is arranged for fluid engagement with a body member (42) for the transmission of torque thereto when the fluid is disposed in an operating chamber (70) defined by complimentary shear surfaces (30 and 56) in the clutch and body members. During relative rotation between the two members, fluid is pumped from the operating chamber to a storage chamber (76). Fluid is returned to the operating chamber via bleed ports (94) which are selectively restricted by an electromagnetically controlled valve (88). A control system (110) senses vehicle coolant temperature and actuates the valve as a function thereof.

32 Claims, 4 Drawing Figures

FIG. 3.

MAGNETICALLY ACTUATED VISCOUS FLUID COUPLING

INTRODUCTION

The present invention relates to viscous fluid couplings, and more particularly to such couplings which are turned "on" or "off" as a function of the temperature of an associated fluid. More particularly still, the present invention relates to viscous fluid couplings which are employed as vehicle fan drives and which are actuated as a function of coolant temperature.

CROSS REFERENCE

The subject matter of this application is related to that of U.S. application Ser. No. 681,106, filed Apr. 28, 1976, now U.S. Pat. No. 4.056,178, issued Nov. 1, 1977; and U.S. application Ser. No. 020,282, filed Mar. 14, 1979 now U.S. Pat. No. Re. 30,428, reissued Nov. 4, 1980.

BACKGROUND OF THE INVENTION

Viscous fluid couplings have received wide acceptance in the automotive industry for controlling the amount of torque transmitted to a radiator cooling fan. The most common form of such viscous fluid couplings is the air temperature response type such as illustrated in U.S. Pat. No. 3,055,473. In certain applications, however, it has become desirable to directly sense the engine cooling water temperature rather than temperature of the air passing through the radiator. To date, many arrangements have been proposed to accomplish this result. Typically, these arrangements have made use of wet or dry plate clutches that are pneumatically actuated or electromagnetic clutches that are electrically actuated. A major shortcoming of many prior art magnetically actuated clutches or couplings resides in the fact that relatively high torque levels are involved. These high torque levels require relatively massive engagement mechanisms which must be engaged through the action of relatively intense magnetic fields set up by large and expensive inductors. Such inductors draw substantial amounts of energy from the associated vehicle's electrical system and thus reduce overall operational efficiency. Additionally, such devices typically employ relatively large springs which bias a portion of the engagement mechanism toward either the engaging or nonengaging position. Accordingly, the magnetic field must also overcome the force of the biasing spring as well as the mass of the engagement mechanism.

More recently, improved prior art electromechanically actuated viscous fluid couplings have been suggested which employ inductors to establish magnetic fields which actuate valves controlling the flow of viscous fluid within the clutch. This arrangement represents an improvement inasmuch as the magnetic field established by the inductor only had to be large enough to move a relatively small valving arm and biasing spring. Although representing an improvement, such devices had inherent inefficiencies inasmuch as their valving arm biasing springs had to be large enough to overcome the kinetic energy of the viscous fluid flowing therein.

It will be apparent from a reading of the specification that the present invention may be advantageously utilized with fluid couplings intended for many different applications. However, the invention is especially useful when applied to a viscous coupling or clutch which serves as a drive for a radiator cooling fan of a vehicle engine, and will be described in connection therewith.

BRIEF DESCRIPTION OF THE INVENTION

The present invention finds particular application in a viscous fluid clutch of the type including first and second clutch members mounted for relative rotation about a common axis and defining cooperating shear surfaces which operate to transmit torque when a flow of viscous fluid is established therebetween. According to the invention, and by way of overcoming the above described shortcomings of viscous fluid clutches, the viscous fluid clutch is provided with a valving element which is mounted for rotation with one of the members and is operable to frictionally engage the other member to modulate the flow of fluid between the cooperating shear surfaces. This arrangement permits control of the clutch with the exercise of a relatively small amount of externally applied energy by tapping the kinetic energy of one of the rotating members.

The preferred embodiment of the invention finds particular application in a motor vehicle viscous fluid clutch of the type which includes a first clutch member fixed on a shaft for rotation therewith, and a second clutch member supported by the shaft for rotation thereabout and having shear surfaces which coact with complimentary shear surfaces on the first member to define an operating chamber therebetween. A fluid storage chamber is located near the operating chamber and a pump provides a circulating flow of viscous fluid between the chambers. According to the preferred embodiment of the invention, a valving element is mounted coaxially with the second member for rotation therewith and is axially displaceable to frictionally engage the shaft to effect modulation of the flow of fluid through a port interconnecting the chambers by angular displacement of the element from a first limit of travel in which the element overlays the port to a second limit of travel in which the port is relatively unobstructed.

According to another aspect of the invention, actuator means such as an electromagnet is provided which operates to displace the valving element from a first nonengaging position to a second position to effect the frictional engagement. This arrangement provides the advantage of an external noncontacting actuating mechanism which can be easily controlled such as by use of a vehicle fluid temperature sensing transducer.

According to another aspect of the invention, biasing means such as a spring is provided to urge the valving element axially into its first position. This arrangement provides the advantage of the utilization of a relatively small spring and commensurate electromagnet inductor current.

According to another aspect of the invention, another spring or biasing means is provided to angularly or rotationally urge the valving element into its first limit of travel where it overlays the fluid drain port interconnecting the chambers. This arrangement, in combination with the biasing means for urging the valving element axially into its first position, has a collective advantage of providing a relatively large spring to resist the rotational displacement of the valving element under the influence of frictional engagement with the shaft, as well as a relatively small spring which axially urges the valving element into its first position against the influence of the electromagnet actuator, whereby a relatively small control current can precisely and dependably control a relatively large viscous clutch.

According to another aspect of the invention, means are provided to compensate for slight skewing or angular misalignment of the clutch members. This arrangement provides a control system for a viscous fluid clutch which will operate effectively even under conditions of broad design tolerances, misalignment in manufacturing or wear during use.

According to still another aspect of the invention, a single spring provides both biasing functions.

Various other features and advantages of this invention will become apparent upon reading the following specification, which, along with the patent drawings, describes and discloses a preferred and an alternative embodiment of the invention in detail.

The detailed description of the disclosed embodiments makes reference to the accompanying drawings.

DETAILED DESCRIPTION OF THE PREFERRED AND ALTERNATIVE EMBODIMENTS

Figures 1, 4:
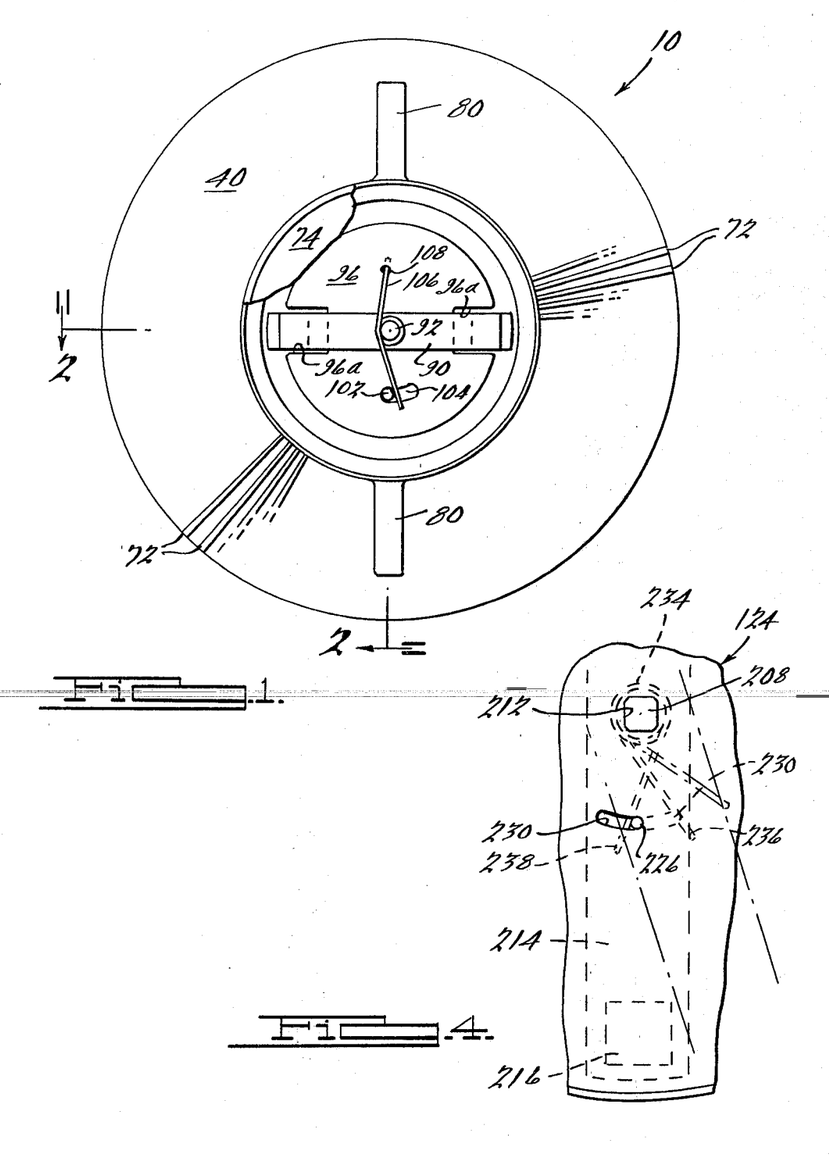
FIG. 1, is a front plan view of the preferred embodiment of the invention with the front cover plate broken away.
FIG. 4, is a partial front view of the clutch of FIG. 3.
Figure 2:
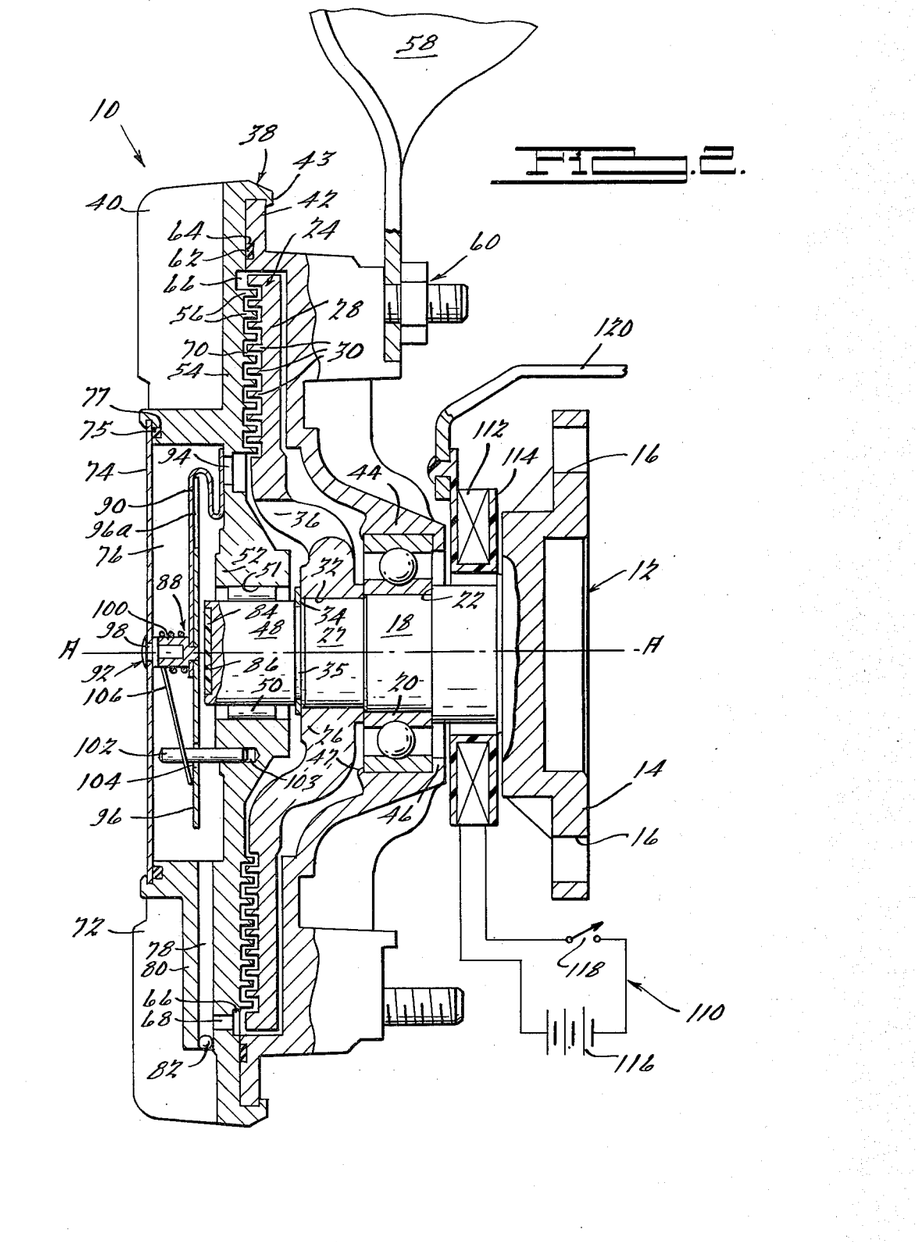
FIG. 2, is a cross-sectional view on an enlarged scale taken on line 2—2 of FIG. 1.

Referring to FIGS. 1 and 2, the preferred embodiment of a viscous fluid clutch 10 is illustrated. Clutch 10 comprises a driving or input shaft 12 including an integral shaft flange 14. Flange 14 defines a number of circumferentially spaced apertures 16 which accommodate bolts (not shown) for mounting clutch 10 to a driven shaft (not shown) such as that of an automobile engine coolant pump which is driven by a pully and V-belt as is well known in the art. Driving shaft 12 is provided with a reduced intermediate portion 18 which functions as an inner race supporting surface for a ball bearing assembly 20. A shoulder 22 formed on shaft 12 restrains bearing 20 in one axial direction.

A clutch member 24 is provided with a hub portion 26 and a plate portion 28 having a plurality of concentric annular coupling lands 30 formed on the front side thereof. Hub portion 26 is provided with a straight wall opening 32 which has an interference fit with a second reduced intermediate portion 27 of shaft 12 so that clutch member 24 rotates with and is axially retained on shaft 12. Hub portion 26 is pressed onto shaft portion 27 until it abuts the inner race of bearing 20 to confine bearing 20 in the other direction of axial movement. Clutch member 24 is further retained to shaft 12 by a retaining ring 34 disposed in a circumferential slot 35 within shaft 12. Several breathing apertures 36 are formed in clutch member 24 at the point of transistion between hub portion 26 and plate portion 28.

A clutch cover assembly 38 comprising a cover member 40 and a body member 42 is mounted for rotation on shaft 12. Body 42 includes a hub 44 which is supported on the lateral surface of the outer race of bearing assembly 20 and is disposed in an interference fit therewith. Two shoulder portions 46 and 47 of hub 44 react against both end surfaces of the outer race of bearing assembly 20 and limit movement of body 42 in both axial directions.

The end of shaft 12 distal flange 14 terminates in a reduced end portion 48 which functions as an inner race supporting surface for a roller bearing assembly 50. Cover 40 includes a hub 52 and a plate portion 54 having a plurality of concentric annular coupling lands 56 on the back side thereof. Hub 52 is supported on the lateral surface of the outer race of bearing assembly 50 and is disposed in an interference fit therewith. Body 42 and cover 40 are thereby free to rotate about shaft 12 on bearing assemblies 20 and 50. Cover 40 is affixed to body 42 by means of a shoulder portion 43 which circumferentially embraces the radially outwardmost edge of body 42. Shoulder portion 43 is preferably formed by swedging or otherwise locally deforming cover 40. A plurality of fan blades 58 are secured at the shank portion thereof by studs, nuts and lockwashers 60 at a radially intermediate portion of body 42. An elastomeric seal 62 resides in an annular channel 64 in the radially outward most portion of body 42 which abuts cover 40.

Cover 40 is provided with an annular recess 66 formed in the face thereof on the side adjacent lands 30. A pair of diametrically opposed axially directed holes 68 are disposed slightly radially outwardly of annular lands 56 within cover 40. Annular lands 56 and 30 as well as the adjoining grooved portions of body 42 and cover 40 constitute shear surfaces and define an operating chamber generally designated 70 which operates such as described in U.S. Pat. No. 4,056,178, the specification of which is incorporated herein by reference. Annular lands 30 terminate or are alternately cut away in the form of a V-notch to form three equally spaced radially directed channels. The structure defines a known fluid path commencing with the area adjacent lands 30 and 56, the radial channels, axially directed holes 68 and annular recess 66.

Cooling fins 72 are integrally formed in cover 40 adjacent fan blades 58. Cooling fins 72 are arranged to provide additional cooling area and dissipate heat which is generated in clutch 10.

The radially innermost portion of the outside surface of cover 40 coacts with a cover plate 74 to define a fluid storage chamber designated at 76. The end of shaft 12 distal flange 14 passes through roller bearing assembly 50 as well as a straight wall opening 51 in hub 52 of cover 40, and terminates within fluid storage chamber 76. The material of cover 40 proximate the peripheral edge of cover plate 74 is deformed to retain plate 74. An elastomeric seal 75 resides in an annular channel 77 in the leftward most surface of cover 40 (adjacently radially outwardly of chamber 76) which abuts cover plate 74.

Two diametrically opposed radially directed return passage apertures 78 interconnect holes 68 with substantially annular fluid storage chamber 76. Apertures 78 pass through associated areas of increased wall thickness 80 within cover 40. The radially outwardmost ends of return passage apertures 78 are sealed with an interference fit ball 82 or other suitable material. The end of shaft 12 distal flange 14 defines a plane normal to the axis of rotation (designated A—A) of clutch 10. A plastic bearing insert 84 is disposed within a recess 86 within the end of shaft 12 distal flange 14. The lefthand most (as viewed in FIG. 2) coterminous surfaces of shaft 12 and insert 84 constitute a first thrust or friction surface.

An elongated valving element assembly generally designated 88 is disposed within fluid storage chamber 76 and comprises an elongated valve blade 90 which is supported on cover plate 74 by a stanchion assembly 92. The ends of blade 90 terminate in serpentine fashion with the endmost portions overlaying relatively large diametrically opposed drain ports 94 which are disposed within cover 40 near the radially outwardmost extent of fluid storage chamber 76 to provide fluid communication between operating chamber 70 and fluid storage chamber 76. The serpentine nature of valve blade 90 causes its ends to self bias themselves against the surface of cover 40 immediately surrounding drain ports 90. Accordingly, as illustrated in FIG. 2, valve blade 90 is pressing rightwardly against the lefthand most surface of cover 40 within fluid storage chamber 76 to effectively restrict or seal the passageway between chambers 70 and 76 established by ports 94. Stanchion assembly 92 also supports a circular plate 96 which is of slightly smaller diameter than fluid storage chamber 76 and which includes two diametrically spaced radially inwardly directed slots 96a which are of a dimension slightly wider than the width of valve blade 90 and are aligned therewith.

Stanchion assembly 92 comprises a steel pin 98 which has been attached to cover plate 74 such as by swedging after passing through an aperture therein aligned along axis A—A. Pin 98 projects inwardly within fluid storage chamber 76 and nestingly engages a cup shaped brass receptacle 100, the righthand portion of which has been swedged or otherwise suitably affixed to blade 90 and plate 96. Pin 98 telescopingly fits within receptacle 100 and permits rotation thereof as well as rightward axial displacement (as viewed in FIG. 2) but not leftward displacement of receptacle 100. Plate 96 and blade 90 are permitted a small degree (5-10 degrees) of rotational freedom with respect to cover assembly 38. This is accomplished by an anchor pin 102 which is press fit within an aperture 103 within hub 52 of cover 40 which projects into fluid storage chamber 76 and through a plane defined by plate 96. Pin 102 passes loosely through a crescent shaped aperture 104 within plate 96. Blade 90 and plate 96 are therefore permitted freedom of rotation with respect to cover assembly 38 only to the extent of the major dimension of aperture 104. In FIG. 1, plate 96 and blade 90 are illustrated in their first or counterclockwise limit of travel. If plate 96 and blade 90 were rotated clockwise until pin 102 abutted the lefthand most end of slot 104 plate 96 and blade 90 would be in their second or clockwise limit of travel.

A spring 106 carried by receptacle 100 has one radially extended end thereof abutting pin 102 and the other radially extended end thereof passing through an aperture 108 within plate 96 to urge blade 90 and plate 96 into the first limit of travel (as illustrated). The surface of plate 96 facing insert 84 operates as a second thrust or friction surface. The two friction surfaces are spaced from one another when valving element assembly 88 is in its first (as illustrated in FIG. 2) position. The spring action of the serpentine ends of blade 90 bias blade 90 as well as plate 96 leftwardly away from shaft 12.

Valve actuator means generally designated 110 are supplied in the form of an electromagnet comprising an inductor 112 wound within a spool 114 constructed of insulating material and disposed concentrically about shaft 12 intermediate flange 14 and portion 18, which is energized through a series connection with a voltage source 116 such as the vehicle's electrical system and a switch 118 which senses the temperature of a fluid associated with clutch 10. Switch 118 is preferably a standard coolant temperature sensing switch but it is understood that it could also be a bimetal or other suitable ambient air temperature sensing device, fluid being defined herein as any relevant gas or liquid. Coil 112 and spool 114 are fixedly attached to the vehicle engine or structure by means of a suitable bracket 120.

Shaft 12 and plate 96 are constructed of steel or other ferrous material. When switch 118 is closed and coil 112 energized, a magnetic circuit is established through shaft 12, across the space between insert 84 and plate 96, radially outwardly along plate 96 and back through the atmosphere to flange 14. Restated, a predetermined operating condition (coolant temperature) of an associated apparatus (vehicle engine) establishes a control signal (magnetic circuit). Clutch member 24, cover 40 and body 42 are constructed of zinc, aluminum or other suitable material.

When switch 118 is closed, and coil 112 is electrically energized, the magnetic field effected thereby is of sufficient intensity as to draw plate 96 rightwardly until it contacts insert 84 and the lefthand most surface of shaft 12. Such contact is designated, for the purposes of the present specification, as frictional engagement whereby during relative rotation between cover assembly 38 and clutch member 24, such frictional engagement will tend to impart torque to plate 96 and thereby rotate it clockwise (see FIG. 1) from the first limit of travel to the second limit of travel. Definitionally, when energized, plate 96 is displaced axially rightwardly from its first position (illustrated) to its second position in which it frictionally engages shaft 12 and insert 84. When coil 112 is energized and plate 96 and blade 90 are rotated to their second limit of travel, the ends of blade 90 will uncover ports 94 and thus allow viscous fluid stored in chamber 76 to pass under the influence of centrifugal force into operating chamber 70. When switch 118 is opened, the magnetic field collapses and the spring function of blade 90 will return the central portion of blade 90 as well as plate 96 to their first (illustrated) position. With the loss of frictional engagement with shaft 12, spring 106 will rotate plate 96 and blade 90 back to their first limit of travel, thereby closing drain ports 94 and preventing further passage of viscous fluid into operating chamber 70.

In operation, the pumping action caused by the sweeping of the radially outwardmost portion of clutch member 24 by annular recess 66 causes a localized region of increased pressure within the operating chamber 70. This pumping action is well known in the art and is described in detail in U.S. Pat. No. 3,809,197, the specification of which is incorporated herein by reference. This increased pressure causes the viscous fluid in the operating chamber 70 to pass through holes 68 and into return passage aperture 78. The fluid will then pump radially inwardly through return passage aperture 78 and into fluid storage chamber 76.

As should be obvious to one of ordinary skill in the art, valving element 88 can be made to contact clutch member 24, shaft 12 or other associated structure. Accordingly, for the purposes of the claims, frictional engagement with a member includes engagement with any structure (such as shaft 12) rotating with such member.

Valving element assembly 88 has an additional advantage inherent in its structure. If clutch member 24 and cover assembly 38 become slightly skewed with respect to one another due to misassembly, wear or the like, and as a consequence the planes defined by plate 96 and insert 84 are not parallel, engagement of assembly 88 with shaft 12 will cause plate 96 to rotate and become aligned with the plane defined by insert 84. Such compensation will not affect the operation of the clutch 10 because the serpentine construction of blade 90 will allow one end to expand slightly while the other end contracts slightly during the compensation process without loss of function or seal.

Figure 3:
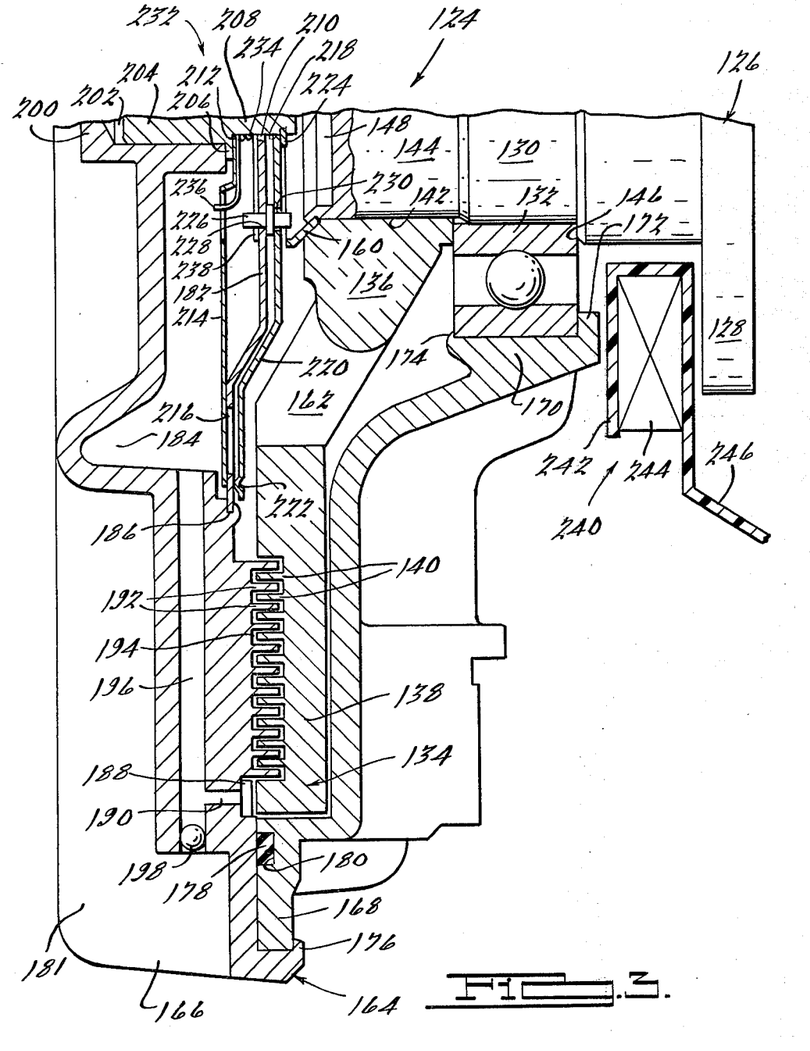
FIG. 3, is a half sectional view of an alternative embodiment of the invention.

Referring to FIGS. 3 and 4, and alternative embodiment of a viscous fluid clutch 124 is illustrated. Clutch 124 comprises a driving shaft 126 including an integral shaft flange 128 for mounting clutch 124 to a driven shaft (not shown) such as that of an automobile engine coolant pump which is driven by a pulley and V-belt as is well known in the art. Driving shaft 126 is provided with a reduced intermediate portion 130 which functions as an inner race supporting surface for a ball bearing assembly 132.

A clutch member 134 is provided with a hub portion 136 and a plate portion 138 having a plurality of concentric annular coupling lands 140 formed on the frontside thereof. Hub portion 136 is provided with a straight wall opening 142 which has an interference fit with a second reduced intermediate portion 144 of driving shaft 126 so that clutch member 134 rotates with and is axially retained on shaft 126. Hub portion 136 is pressed onto shaft portion 144 until it abuts the inner race of bearing 132 to confine bearing 132 in one direction of axial movement. Bearing 132 is confined in the other direction of axial movement by a shoulder 146 formed on shaft 126. The end of shaft 126 distal flange 128 has a depression 148 therein. Clutch member 134 is further retained to shaft 126 by swedging of shaft portion 144 proximate depression 148. A frustoconically shaped wear piece 160 is trapped and retained between portion 144 of shaft 126 and hub 136 by the swedging of portion 144 of shaft 126. Several breathing apertures 162 are formed in clutch member 134 at the point of transistion between hub portion 136 and plate portion 138.

A clutch cover assembly 164 comprising a cover member 166 and a body member 168 is mounted for rotation on shaft 126. Body 168 includes a hub 170 which is supported on the lateral surface of the outer race of bearing assembly 132 and is disposed in an interference fit therewith. A shoulder portion 172 of hub 170 reacts against an end surface of the outer race of bearing assembly 132 and limits movement of body 168 in one axial direction. A second shoulder portion 174 also formed in hub 170 limits movement of body 168 in the other axial direction. Body 168 and cover 166 are thereby free to rotate about shaft 126 upon bearing assembly 132. A plurality of fan blades (not illustrated) secured at the shank portion thereof by bolts (not illustrated) at a radially intermediate portion of body 168 as is illustrated in the preferred embodiment of the invention (FIG. 2). Cover 166 is affixed to body 168 by means of a shoulder portion 176 which circumferentially embraces the radially outwardmost edge of body 168. Shoulder portions 174 and 176 are preferably formed by swedging or otherwise locally deforming body 168 and cover 166 respectively. An elastomeric seal 178 resides in an annular channel 180 in the radially outward most portion of body 168 which abuts cover 166.

Cooling fins 181 are integrally formed in cover 166 adjacent the fan blades. Cooling fins 181 are arranged to provide additional cooling area to dissipate heat which is generated in clutch 124.

A reservoir cover plate 182 and a portion of cover 166 cooperate to define a fluid storage chamber 184. Reservoir cover plate 182 is received in an annular notched recess 186 provided in cover 166 to laterally confine cover plate 182. The material of cover 166 proximate the peripheral edge of cover plate 182 is deformed to retain and seal plate 182 in notched recess 186.

Cover 166 is provided with an annular recess 188 formed in the face thereof on the side adjacent lands 140. A pair of diametrically opposed axially directed holes 190 are disposed slightly radially outwardly of a second set of annular lands 192, which are defined by cover 166. Annular lands 140 and 192 and the adjoining grooved portions of body 168 and cover 166 constitute shear surfaces and define an operating chamber 194 which operates such as described in U.S. Pat. No. 4,056,178, the specification of which was hereintofore incorporated by reference. Annular lands 140 terminate or alternately are cut away in the form of a V-notch to form three increased radially directed channels. The structure defines a known fluid path commencing with the area adjacent lands 140 and 192, the radially directed channels, axially directed holes 190 and annular recess 188.

Two diametrically opposed radially directed return passage apertures 196 are drilled in cover 166 and interconnect holes 190 with fluid storage chamber 184. The radially outwardmost ends of return passage apertures 196 are sealed with an interference fit ball 198 or other suitable material.

Cover 166 comprises a second hub portion 200 which defines a cylindrical stanchion receiving recess 202 which is coaxially aligned with shaft 126 and opens inwardly within fluid storage chamber 184. A cylindrical stanchion 204 is nestingly slidably disposed within recess 202 which acts to radially locate stanchion 204 while allowing it to freely rotate therein. A shoulder 206 integrally formed in stanchion 204 abuts the inner surface of cover member 166 adjacent recess 202 and limits leftward axial displacement of stanchion 204 as viewed in FIG. 3. A key portion 208 having a substantially square cross-section is integrally formed in stanchion 204, projecting inwardly from shoulder 206, through fluid storage chamber 184, and through a registering aperture 210 within reservoir cover plate 182. Key portion 208 then terminates adjacent depression 148 in shaft 126. Aperture 210 is of a dimension slightly larger than the diagonal dimension of key portion 208 whereby stanchion 204 can rotate within recess 202 without key portion 208 contacting cover plate 182.

Key portion 208 passes through a square aperture 112 within an elongated valve blade 214 disposed within fluid storage chamber 184. Valve blade 214 operates to rotate with stanchion 204 and selectively covers and uncovers two diametrically opposed drain ports 216 formed in reservoir cover plate 182. Drain ports 216 provide a path of fluid communication between fluid storage chamber 184 and operating chamber 194.

Key portion 208 of stanchion 204 also passes through a square aperture 218 within a circular friction plate 220 which overlays reservoir cover plate 182 within operating chamber 184. Plate 220 operates to rotate with stanchion 204 and maintains minimal spacing from reservoir cover plate 182 through the use of a plurality of circumferentially spaced dimples 222 integrally formed in the radially outermost edge of plate 220. Dimples 222 are provided to maintain uniform spacing between plates 222 and 182 and allow drainage of viscous fluid within fluid chamber 184 into operating chamber 194 through drain ports 216. A retaining ring 224 disposed within a circumferential slot adjacent the end of key portion 208 of stanchion 204 restrains friction plate 222 from rightward axial displacement as viewed in FIG. 3. The points of contact of dimples 222 with associated areas of cover plate 182 restrain plate 220 from axial displacement in the leftward direction.

An anchor pin 226 is press fit through a receiving aperture 228 within reservoir cover plate 182 and projects leftwardly therefrom into fluid storage chamber 184 and rightwardly therefrom into the space between plate 220 and shaft 126. The rightwardly projecting portion of anchor pin 226 passes through a crescent shaped aperture 230 within friction plate 220 and acts as a rotational stop therefore. The angular dimension of aperture 230 will thus determine the limits of rotational travel of friction plate 220.

For the purposes of the present specification, friction plate 220, snap ring 224, stanchion 204 and valve blade 214 collectively comprise a valving element assembly designated generally as 232. Referring to FIG. 4, assembly 232 is illustrated in its first limit of travel wherein valve blade 214 overlays drain ports 216. Assembly 232 is operable for counterclockwise displacement to a second limit of travel through an arc determined and defined by the major dimension of aperture 230. A coil spring 234 is restrained from radial displacement by key portion 208 of stanchion 204 and operates to bear axially in one direction against reservoir cover plate 182 and in the other direction against shoulder 206 of stanchion 204. Stanchion 204 is thus biased into its illustrated first position. Valving element assembly 232 is operable for rightward axial displacement as viewed in FIG. 3 against the biasing effects of spring 234 for displacement from the first (illustrated) position to a second position in which friction plate 220 frictionally engages the left-hand most surface of wear piece 160. In transitioning between the first and second positions, only the central portion of blade 214 is displaced axially. The outer ends of blade 214 remain in their illustrated abutting relationship, overlaying drain ports 216 until plate 220 actually contact wear piece 160.

The ends of spring 234 terminate in first and second radially outward projections 236 and 238. Projection 236 abuts an edge of valve blade 214 and projection 238 abuts anchor pin 226. Spring 234 thereby also operates to rotationally bias valving element assembly 232 into its first limit of travel as illustrated in FIG. 4. When valving element assembly 232 is operated upon for displacement from its first position to its second position to effect frictional engagement between friction plate 220 and wear plate 160, the tangential force component established by said frictional engagement will operate to rotate valving element assembly 232 from its first limit of travel to its second limit of travel and thereby opening drain ports 216 to allow viscous fluid within fluid storage chamber 184 to migrate therethrough into operating chamber 194 under the influence of centrifugal forces.

Actuation of valving element assembly 232 is accomplished through an actuator means shown generally at 240 comprising a retaining spool constructed of plastic or other suitable insulative material to retain an electrical inductor 244. Spool 242 and coil 244 are loosely positioned or, alternatively, bearing mounted concentrically about shaft 126 and are tethered or otherwise affixed to the engine associated with clutch 124 or other suitable structure via an extension piece 246 integrally formed with spool 242. Coil 244 is electrically connected in a series combination with a source of electrical potential and a switch as was described in detail in the discussion relating to FIG. 2 hereinabove. When electrically energized, coil 244 will form an electromagnetic circuit in combination with shaft 126 which is constructed of ferrous material as is friction plate 220. The magnetic attraction between wear piece 160 and friction plate 220 will cause valving element assembly 232 to be drawn rightwardly from its first (illustrated) position to its second position. When coil 244 is deenergized, spring 234 will return valving element assembly 232 to its first position. The operation of the alternative embodiment of the invention is substantially the same as that described in the preferred embodiment of the invention and is deleted here for the sake of brevity. The alternative embodiment of the invention allows for relatively great misalignment between shaft 126 and cover assembly 164 which can be caused by the use of single bearings.

FIG. 4 illustrates the rotational displacement of blade 214 in a first sense from its first limit of travel wherein it overlays ports 216, to its second limit of travel wherein port 216 are unobstructed. Deenergization of actuator 240 will cause blade 214 to rotate in a second sense from its second limit of travel to its first limit of travel under the influence of spring 234. The relationship of aperture 230 and anchor pin 226 is illustrated both in the first limit of travel (solid line) and second limit of travel (broken line).

It is to be understood that the invention has been described with reference to specific embodiments which provide the features and advantages previously described, and that such specific embodiments are susceptible of modification, as will be apparent to those skilled in the art. For example, a failsafe operational arrangement can easily be incorporated within clutch 124 (or 10) by reversing the orientation of ports 216 with respect to blade 214, so that in the first position of valving element assembly 232, ports 216 are open. When coil 244 is energized, assembly 232 moves to its second position to close ports 216. In this manner, if coil 244 is not properly energized (switch or wire breaks, etc.) for any reason, ports 216 will open and clutch 124 will automatically engage. Accordingly, the foregoing is not to be construed in a limiting sense.

What is claimed is:
1. A viscous fluid clutch comprising:
first and second members mounted for relative rotation about a common axis and defining cooperating shear surfaces;
means operative to generate a flow of viscous fluid between said surfaces; and
a valving element carried by one of said members and operable to frictionally engage the other of said members to effect modulation of said flow by producing a limited rotation of said valving element with respect to said valve element carrying member.

2. The viscous clutch of claim 1, wherein said valving element comprises means operative to compensate for relative misalignment of said first and second members.

3. The viscous clutch of claim 1, wherein said means operative to generate a flow of viscous fluid comprises a pump operative to displace said fluid as a function of relative rotation between said first and second members.

4. A viscous fluid clutch comprising:
first and second members mounted for relative rotation about a common axis and defining cooperating shear surfaces;
means operative to generate a flow of viscous fluid between said surfaces;
a valving element mounted for rotation with one of said members and operable to frictionally engage the other of said members to effect modulation of said flow; and
actuator means operative to displace said valving element from a first position to a second position to effect said engagement.

5. The viscous clutch of claim 4, wherein said valving element comprises means operative to compensate for relative misalignment of said first and second members.

6. The viscous clutch of claim 4, wherein said means operative to generate a flow of viscous fluid comprises a pump operative to displace said fluid as a function of relative rotation between said first and second members.

7. The viscous clutch of claim 4, wherein said valving element operates to restrict said flow in said first position.

8. The viscous clutch of claim 4, wherein said actuator means displaces said valving element axially with respect to said first and second members.

9. The viscous clutch of claim 4, wherein said actuator means comprises an electromagnet operative to establish a magnetic circuit which passes through ferrous material within said valving element.

10. The viscous clutch of claim 9, wherein said electromagnet comprises an inductor disposed concentrically about said axis which is electrically energized as a function of the temperature of a fluid associated with said clutch.

11. The viscous clutch of claim 4, further comprising means operative to bias said valving element into said first position.

12. A viscous fluid clutch comprising:
a first member secured for rotation with a shaft;
a second member rotatably disposed on said shaft relative to said first member;
shear surfaces disposed on said first and second members and forming an operating chamber therebetween;
a fluid storage chamber adjacent said operating chamber;
means operative to generate a circulating flow of viscous fluid between said chambers; and
a valving element mounted for rotation with said second member and operable to frictionally engage said shaft to effect modulation of said flow by angular displacement of said element.

13. The viscous clutch of claim 12, further comprising actuator means operative to displace said valving element from a first position to a second position to effect said engagement.

14. The viscous clutch of claim 13, wherein said valving element operates to restrict said flow in said first position.

15. The viscous clutch of claim 13, wherein said actuator means displaces said valving element axially with respect to said shaft.

16. The viscous clutch of claim 15, wherein said valving element is angularly displaced in a first sense when in said second position.

17. The viscous clutch of claim 16, further comprising means operative to angularly bias said valving element in a second sense.

18. The viscous clutch of claim 17, wherein said biasing means also operates to bias said valving element axially into said first position.

19. The viscous clutch of claim 13, wherein said actuator means comprises an electromagnet operative to establish a magnetic circuit which passes through ferrous metal within said shaft and valving element.

20. The viscous clutch of claim 19, wherein said electromagnet comprises an inductor disposed concentrically about said shaft which is electrically energized as a function of the temperature of a fluid associated with said clutch.

21. The viscous clutch of claim 13, further comprising means operative to bias said valving element into said first position.

22. The viscous clutch of claim 12 wherein said valving element comprises means operative to compensate for relative misalignment of said first and second members.

23. The viscous clutch of claim 12, wherein said valving element is disposed within said fluid storage chamber.

24. A viscous fluid clutch comprising:
a first member secured for rotation with a shaft;
a second member rotatably disposed on said shaft relative to said first member;
shear surfaces disposed on said first and second members and forming an operating chamber therebetween;
a fluid storage chamber adjacent said operating chamber;
a pump operative to displace fluid from said operating chamber to said storage chamber as a function of relative rotation between said members;
at least one drain port interconnecting said chamber for fluid communication therebetween; and
a valving element mounted coaxially with said second member for rotation therewith and axially displacable to frictionally engage said shaft to effect modulation of the flow of fluid through said port by angular displacement of said element from a first limit of travel in which said element overlays said port to a second limit of travel in which said port is relatively unobstructed.

25. The viscous fluid clutch of claim 24, further comprising a tethered electromagnet disposed concentrically about said shaft and operative to displace said valving element from said first position to said second position.

26. The viscous fluid clutch of claim 25 wherein said electromagnet comprises an inductor which is electrically energized as a function of the temperature of a fluid associated with said clutch.

27. The viscous fluid clutch of claim 24, further comprising means operative to bias said valving element axially into said first position.

28. The viscous fluid clutch of claim 27, wherein said biasing means further operates to bias said valving element angularly into said first limit of travel.

29. The viscous fluid clutch of claim 24, further comprising means operative to bias said valving element angularly into said first limit of travel.

30. The viscous fluid clutch of claim 24, wherein said valving element is disposed within said fluid storage chamber.

31. The viscous clutch of claim 24, wherein said valving element comprises means operative to compensate for relative misalignment of said first and second members.

32. A viscous clutch comprising:

first and second members mounted for relative rotation about a common axis and having cooperating sheer surfaces defining therebetween an operating chamber containing viscous fluid;

means operative in response to sensing of a predetermined operating condition of an associated apparatus to generate a control signal;

a valving element movable to vary the amount of operating fluid in said chamber and thereby vary the transmission of torque between said members; and means operative in response to said control signal to extract kenetic energy from one of said members and input it to said valving element to move said valving element and thereby vary the torque transmitted between said members.

* * * * *